3,132,170
CHLOROORGANOPYROPHOSPHATES

Rudolf Gerardus Brautigam, New Brunswick, and Erwin Jacoves, Elizabeth, N.J., assignors to American Agricultural Chemical Company, a corporation of Delaware
No Drawing. Filed July 11, 1961, Ser. No. 123,095
14 Claims. (Cl. 260—461)

This invention relates to chloroorganopyrophosphates and to a method of preparing chloroorganopyrophosphates. More particularly, this invention is directed to a single step operation for the preparation of chloroorganopyrophosphates, such as tetrachloroorganopyrophosphates, e.g. tetrachloroalkylpyrophosphates, tetrachloroarylpyrophosphates, tetrachlorocycloalkylpyrophosphates, tetrachloroaralkylpyrophosphates, tetrachloroalkarylpyrophosphates and the like. It has been proposed to prepare a tetrachloroalkylpyrophosphate by reacting phosphorus oxychloride with a chloro-substituted ethanol, $$ClCH_2CH_2OH$$

to form 2-chloroethylphosphoryl monochloride and to react 2-chloroethylphosphoryl chloride with anhydrous sodium acetate to form tetra-2-chloroethylpyrophosphate, see U.S. 2,718,524.

It is an object of this invention to provide novel chloroorganopyrophosphates.

It is another object of this invention to provide a simple, direct method of preparing chloroorganopyrophosphates.

Another object of this invention is to provide a simple, straightforward method for the preparation of tetrachloroorganopyrophosphates.

Still another object of this invention is to provide a method for the manufacture of tetrachloroalkylpyrophosphates and the like.

How these and other objects of this invention are achieved will become apparent in the light of the accompanying disclosure.

In at least one embodiment of the practice of this invention at least one of the foregoing objects will be achieved.

In accordance with this invention novel chloroorganopyrophosphates, such as tetrachloroorganopyrophosphates characterized by the structural formula:

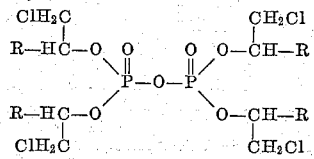

wherein R is selected from the group consisting of hydrogen and an organic radical, such a hydrocarbyl radical, e.g. alkyl, aryl (including aralkyl and alkaryl) cycloalkyl, alkenyl, alkynyl and the like or wherein R is an organic radical containing only carbon, hydrogen and oxygen atoms, or carbon, hydrogen, oxygen and nitrogen atoms, or carbon, hydrogen and halogen atoms, are prepared by reacting an epoxy compound, such as monoepoxide, with pyrophosphoryl chloride as indicated by the chemical equation:

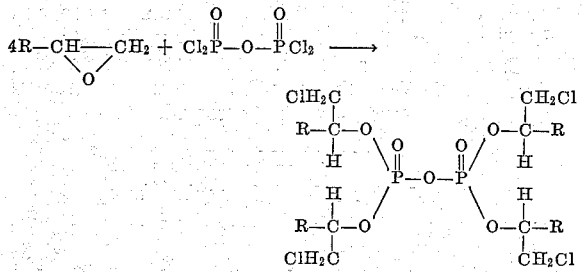

wherein R is as aforesaid.

In the practice of this invention for the preparation of tetrachloroorganopyrophosphates one of the reagents may be employed in excess. It is preferred, however, to employ at least 4 mols of the epoxy compound per mol of pyrophosphoryl chloride.

The reaction between the epoxy compound and pyrophosphoryl chloride is carried out in the liquid phase and preferably at a low temperature, such as a temperature in the range 0–100° C., more or less. Desirably, the reaction is carried out in the presence of a catalyst, although the use of a catalyst is not necessary. It is preferred to use a catalyst since the reaction for the preparation of the tetrachloroorganopyrophosphates can be made to proceed more readily and at a lower temperature, thereby tending to reduce undesirable side reactions which usually result in a reduction in the yield of the desired product, the tetrachloroorganopyrophosphates to be produced.

Various catalysts may be employed in the practice of this invention. Lithium chloride is a suitable catalyst. Friedel-Crafts type catalysts are preferred, i.e. metal halide catalysts, such as ferric trichloride, aluminum trichloride, antimony trichloride, titanium tetrachloride and the like.

In the practice of this invention any epoxy compound may be employed. Monoepoxy compounds characterized by the structural formula:

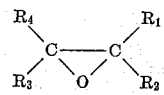

wherein $R_1$, $R_2$, $R_3$ and $R_4$ are the same or different and are radicals selected from the group consisting of organic radicals broadly, such as halogen-containing organic radicals, the hydrocarbyl radicals such as alkyl radicals, aryl radicals, cycloalkyl radicals and the like, and hydrogen are particularly suitable. More particularly, the monoepoxy compounds suitably employed in the preparation of tetrachloroorganopyrophosphates in accordance with this invention include such epoxy compounds as ethylene oxide, propylene oxide, butylene oxide, the various pentylene oxides, hexylene oxides, heptylene oxides, octylene oxides, nonylene oxides, decylene oxides, dodecylene oxides and the like, allyl 9,10-epoxy stearate, 1,2-diisobutylene oxide, 3,4-epoxy-cyclohexane carbonitrile, 2,3-epoxy-2-ethyl hexanol, 3,4-epoxy-6-methyl cyclohexylmethyl acetate, ethyl-3,4-epoxy-2,5-endomethylene cyclohexoate, styrene oxide, vinyl cyclohexene monoxide, the tri-isobutylene oxides, epichlorohydrin, epibromohydrin, alpha pinene oxide, glycidol, limonene monoxide, 1,2-epoxy-3-phenoxypropane, 1,2-epoxy-3-isopropoxy propane and the like. In general, any monoepoxy compound containing from two to 20 carbon atoms or more, and epoxy compounds containing only carbon, hydrogen and oxygen atoms, or carbon, hydrogen, halogen and oxygen atoms or carbon, hydrogen, nitrogen and oxygen atoms or carbon, hydrogen, nitrogen, halogen and oxygen atoms may be employed in the practice of the invention. Particularly useful are the aliphatic epoxides, such as the straight chain or branched chain aliphatic epoxides.

The reaction between the epoxy compound and the pyrophosphoryl chloride is sometimes desirably carried out in the presence of a substantially inert solvent or diluent. Compounds, or mixtures thereof, suitable for use as a solvent or diluent in accordance with this invention include benzene, toluene, cyclohexane, the xylenes, the various higher molecular weight monocyclic and polycyclic aromatic hydrocarbons, the halogenated hydrocarbons such as carbon tetrachloride, trichloroethylene, tetrahydrofuran acetonitrile, the higher aliphatic and cycloaliphatic ethers and the like.

The following examples are illustrative of the practices of this invention:

EXAMPLE NO. 1

Tetra-2-Chloroethylpyrophosphate 200 grams of ethylene oxide (4.5 mols) were added to a solution of 252 grams pyrophosphoryl chloride (1.0 mol) and 0.1 gram of titanium tetrachloride. The ethylene oxide was passed into the reaction mixture via a gas addition tube while the reaction mixture was stirred vigorously. External cooling was used to keep the temperature of the reaction mixture below 40° C. and the unreacted ethylene oxide after separation in and recovery from a cold trap maintained at −80° C. was returned to the reaction mixture. The ethylene oxide addition was carried out over a ten hour period.

The resulting reaction mixture, recovered at a yield of 426 grams, 99.5% of theory, had the following properties: N-20/D, 1.4646; D-20/20: 1.452; molar refractive index observed 81.43, calculated 81.31.

Low boiling by-products were removed from the reaction mixture by distillation at 100° C. and 5–10 mm. Hg abs. The crude, stripped product, recovered at a yield of 354.0 grams, 82.7% of theory, had the following properties: N-20/D, 1.4692; D-20/20: 1.487; molar refractive index observed 80.19, calculated 81.31.

Product was obtained from the crude, stripped product by distillation in a falling film type still at 100–120° C. and 50 microns Hg abs. The resulting recovered product 237.5 grams, 55.5% of theory, had the following properties: N-20/D, 1.4673; D-20/20, 1.483; molar refractive index observed 80.12, calculated 81.31.

EXAMPLE NO. 2

Tetra-1-Chloro-2-Propylpyrophosphate

Two hundred and fifty five grams of propylene oxide (4.4 mols) were added dropwise to a solution of 252 grams of pyrophosphoryl chloride (1.0 mol) and 0.2 gram of titanium tetrachloride. The temperature of the reaction mixture was maintained between 20 and 60° C. while the reaction mixture was stirred vigorously. After the propylene oxide addition had been completed, the reaction mixture was stirred for an additional two hour period at a temperature of 50° C. to complete the reaction. The excess propylene oxide was removed from the reaction mixture at 34° C. at 5 mm. Hg abs.

The resulting reaction mixture (499.1 grams) had the following properties: N-20/D, 1.4624; D-20/20, 1.323; molar refractive index observed 100.64, calculated 99.78.

Low boiling by-products (11.6 grams) were removed from the reaction mixture by distillation at 90° C. 5–10 mm. Hg abs. The resulting crude product (478.6 grams, 98% of theory) had the following properties: N-20/D, 1.4639; D-20/20, 1.324; molar refractive index observed 100.68, calculated 99.78.

Product was obtained by subjecting the crude product to molecular distillation at 130° C. and 50 microns Hg abs. The recovered product, yield 80% of theory, had the following properties: N-20/D, 1.4608; D-20/20, 1.322; molar refractive index observed 100.42, calculated 99.78.

EXAMPLE NO. 3

Tetra-1-Chloro-2-Butylpyrophosphate

Seventy nine grams of butylene oxide (1.1 mols) were added dropwise to a solution of 63 grams of pyrophosphoryl chloride (0.25 mol) and 0.2 gram of titanium tetrachloride. The reaction mixture was maintained at a temperature between 30°–40° C. by external cooling while being vigorously stirred. After the addition of the butylene oxide was completed, stirring was continued at a temperature of 50° C. for an additional 2 hours to assure completion of the reaction.

Low boiling by-products 3.3 grams were removed from the resulting reaction mixture by distillation at 100° C. and at 10 mm. Hg abs. The recovered crude product, yield 96% of theory, had the following properties: N-20/D, 1.4636; D-20/20, 1.254; molar refractive index observed 118.74, calculated 118.25.

Product was separated from the crude product by molecular distillation at 150° C. and at 50 microns Hg abs. The recovered product, yield 75% of theory, had the following properties: N-20/D, 1.4620; D-20/20, 1.254; molar refractive index observed 118.38, calculated 118.25.

EXAMPLE NO. 4

Tetra-2-Chloroethylpyrophosphate

One hundred and forty eight grams of gaseous ethylene oxide (3.3 mols) were added to a solution of 126 grams of pyrophosphoryl chloride (0.5 mol) in 234 grams of dry benzene (3.0 mols) in the presence of 0.2 gram of titanium tetrachloride. The ethylene oxide was passed into the reaction mixture via a gas dispersion tube while the reaction mixture was vigorously stirred and maintained at a temperature in the range 80–84° C. The time required for the addition of the ethylene oxide was about 10 hours, after which the reaction mixture was stirred for an additional three hours.

The reaction mixture was distilled at 80° C. at 100 mm. Hg abs. to remove benzene and then distilled at 120° C. at 15 mm. Hg abs. to remove low boiling by-products. The resulting stripped reaction mixture was then distilled at 170° C. at 40 microns Hg abs. to recover product. The recovered product, yield 138 grams, 65% of theory, had the following properties: N-20/D, 1.4670; D-20/20, 1.481; molar refractive index observed 80.1, calculated 81.3.

EXAMPLE NO. 5

Tetra-1-Chloro-2,2-Phenylethylpyrophosphate

A solution of 121 grams of styrene oxide (1.1 mols) in 83 grams of dry benzene (1.05 mols) was added dropwise to a solution of 63 grams of pyrophosphoryl chloride (0.25 mol) in 156 grams of dry benzene (2.0 mols) in the presence of 0.2 gram of titanium tetrachloride as catalyst. The addition was made over a 1–2 hour period and while the temperature of the reaction mixture was maintained between 0° and 10° C. The reaction mixture was stirred for 10 hours after the styrene oxide addition was completed.

The solvent benzene was removed from the reaction mixture by distillation at 75° C. at 300 mm. Hg abs. The resulting crude product was recovered at a yield of 85% of theory.

EXAMPLE NO. 6

Tetra-1-Chloro-2-Dodecylpyrophosphate

One hundred and fifty one grams of 1,2-dodecene oxide (0.82 mol) were added to a solution of 50.4 grams of pyrophosphoryl chloride (0.2 mol) in 156 grams of dry benzene (2.0 mols) in the presence of 0.2 gram of titanium tetrachloride as catalyst. The reaction temperature was maintained at 60° C. during the dropwise addition of the 1,2-dodecene oxide while the reaction mixture was stirred vigorously. After the 1,2-dodecene oxide addition was completed the reaction mixture was stirred at reflux temperature of about 82° C. for 3 hours.

The benzene solvent was removed from the reaction mixture by distillation at 50° C. at 100 mm. Hg abs. and low boiling by-products then removed by distillation at 140° C. at 10 microns Hg abs. 169.1 grams of material, equivalent to 85% of theory, were recovered as product after solvent and excess reactant removal.

EXAMPLE NO. 7

Tetra-1-Chloro-2-Octylpyrophosphate

One hundred and thirty two grams of 1,2 octylene oxide (1.03 mols) were added dropwise to a solution of 63 grams of pyrophosphoryl chloride (0.25 mol) in 163 grams of benzene (2.1 mols) and 0.2 gram of titanium tetrachloride as catalyst. The reaction temperature was held at 85° C., while the reaction mixture was stirred vigorously during the 2 hours addition period. The reaction mixture was then stirred for an additional 4 hours.

The benzene solvent was removed from the reaction mixture by distillation at 40° C. at 160 mm. Hg abs. and the low boiling by-products then removed by distillation at 130° C. at 200 microns Hg. abs. 185.4 grams of a viscous residue, equivalent to 91.7% of theory, was obtained as product.

The chloroorganopyrophosphates prepared in accordance with this invention have many uses. These compounds are particularly useful as intermediates for the preparation of derivative chemical compounds and, as a class, exhibit pesticidal and/or fungicidal properties and are useful as gasoline and lubricating oil additives. Particularly useful are the tetrachloroalkylpyrophosphates e.g. tetra-2-chloroethylpyrophosphate, tetra-1-chloro-2-propylpyrophosphate and tetra-1-chloro-2-butylpyrophosphate as well as the corresponding tetrachloroorganopyrophosphates obtained by reacting styrene oxide, octylene oxide and dodecyl oxide with pyrophosphoryl chloride.

As will be apparent to those skilled in the art in the light of the foregoing disclosure, many modifications, alterations and substitutions are possible in the practice of this invention without departing from the spirit or scope thereof.

We claim:
1. A method of preparing chloroorganopyrophosphates which comprises reacting a monoepoxide with a pyrophosphoryl chloride.
2. A method in accordance with claim 1 wherein the reaction is carried out in the presence of a catalyst.
3. A method in accordance with claim 1 wherein the reaction is carried out in the presence of a solvent.
4. A method in accordance with claim 3 wherein said solvent is benzene.
5. A method in accordance with claim 3 wherein said solvent is carbon tetrachloride.
6. A method in accordance with claim 3 wherein said solvent is trichloroethylene.
7. A method in accordance with claim 3 wherein said solvent is tetrahydrofuran.
8. A method in accordance with claim 1 wherein said monoepoxide is ethylene oxide.
9. A method in accordance with claim 1 wherein said monoepoxide is epichlorohydrin.
10. A method in accordance with claim 1 wherein said monoepoxide is styrene oxide.
11. A method in accordance with claim 1 wherein said monoepoxide is vinylcyclohexene monoxide.
12. A method in accordance with claim 1 wherein said monoepoxide is butylene oxide.
13. A method of preparing tetra-2-chloroethyl pyrophosphate which comprises reacting ethylene oxide with pyrophosphoryl chloride at a temperature in the range 0–100° C. in the presence of a catalyst and an inert solvent.
14. A method of preparing compounds having a structural formula

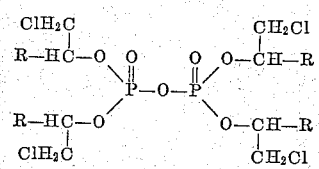

wherein each R is selected from the group consisting of hydrogen and alkyl and phenyl alkyl containing from 2 to 20 carbon atoms which comprises reacting one mol of pyrophosphoryl chloride with at least 4 mols of a monoepoxide providing the substituent R as defined herein, the reaction being carried out at a temperature in the range 0–100° C.

References Cited in the file of this patent
UNITED STATES PATENTS

| | | |
|---|---|---|
| 2,610,978 | Lanham | Sept. 16, 1952 |
| 2,718,524 | Lanham et al. | Sept. 20, 1955 |
| 3,010,988 | Raffelson et al. | Nov. 28, 1961 |